(12) United States Patent
Tame

(10) Patent No.: US 6,536,302 B1
(45) Date of Patent: Mar. 25, 2003

(54) MANUAL ADJUSTMENT MECHANISM FOR A VEHICLE

(75) Inventor: Omar D. Tame, Bloomfield, MI (US)

(73) Assignee: Magna Seating Systems Inc., Aurora (CA)

( * ) Notice: Subject to any disclaimer, the term of this patent is extended or adjusted under 35 U.S.C. 154(b) by 0 days.

(21) Appl. No.: 09/937,490

(22) PCT Filed: Mar. 24, 2000

(86) PCT No.: PCT/CA00/00343

§ 371 (c)(1),
(2), (4) Date: Sep. 24, 2001

(87) PCT Pub. No.: WO00/56570

PCT Pub. Date: Sep. 28, 2000

Related U.S. Application Data (60) Provisional application No. 60/125,897, filed on Mar. 24, 1999.

(51) Int. Cl.$^7$ .............................. G05G 1/10; B60N 2/02; B60N 2/48
(52) U.S. Cl. ............................ 74/543; 74/545; 74/557; 74/528; 74/523; 74/567; 297/367; 297/374
(58) Field of Search ................................. 297/362, 367, 297/374, 361.1; 74/567, 553, 543, 528, 545, 557, 523

(56) References Cited

U.S. PATENT DOCUMENTS

| | | |
|---|---|---|
| 1,263,161 A | 4/1918 | Travers |
| 1,846,429 A | 2/1932 | McGiffert |
| 1,856,534 A | 5/1932 | Boery |
| 2,961,217 A | 11/1960 | Sacchini |
| 3,230,595 A | 1/1966 | Kedem |
| 3,285,657 A | 11/1966 | de Gaston ................. 297/374 |
| 3,517,965 A | 6/1970 | Cowles et al. |
| 3,602,547 A | 8/1971 | Tabor ......................... 297/374 |
| 3,926,474 A | 12/1975 | Johndrow et al. .......... 297/355 |
| 4,062,587 A | 12/1977 | Wolters ....................... 297/306 |
| 4,408,799 A | 10/1983 | Bowman ..................... 297/361 |
| 4,425,987 A | 1/1984 | Porter ......................... 188/67 |

(List continued on next page.)

FOREIGN PATENT DOCUMENTS

| | | | |
|---|---|---|---|
| DE | 36 08 858 A1 | 10/1987 | |
| DE | 38 15 602 A1 | 11/1989 | |
| DE | 38 19 346 A1 | 12/1989 | |
| DE | 196 53 722 A 1 | 7/1998 | |
| JP | 3-62210 | * 3/1991 | ............. 297/374 |

*Primary Examiner*—Vinh T. Luong
(74) *Attorney, Agent, or Firm*—Clark Hill PLC (57) ABSTRACT

A manual adjustment mechanism for adjusting the relative position of a component in a vehicle including a control device for actuating the mechanism. The manual adjustment mechanism includes an input shaft coupled to the control device and an output shaft operatively coupled to the input shaft. A support bracket axially supports the input shaft and the output shaft. A drum shaped housing having a cylindrical inner surface is fixedly secured to the support bracket and rotatably received the input shaft. A coupler is mounted to the input shaft and rotatably disposed within the housing. The coupler includes a pair of spaced apart tube walls planar with and spaced from the inner surface of the housing and a pair of circumferentially opposite tabs projecting between the tube walls. A coiled spring is disposed between the housing and the coupler and compressed against the inner surface of the housing. The coiled spring includes axially and laterally spaced distal end projecting radially between the tube walls of the coupler. The manual adjustment mechanism also includes a cam driver coupled to the output shaft. The cam driver includes a pair of circumferentially spaced apart wedge drivers seated between the respective pair of tube walls and capturing the distal ends of the coiled spring between the wedge drivers and the tube walls.

6 Claims, 6 Drawing Sheets

U.S. PATENT DOCUMENTS

| | | | |
|---|---|---|---|
| 4,533,027 A | 8/1985 | Otani et al. | 192/8 C |
| 4,573,738 A | 3/1986 | Heesch | 297/362 |
| 4,600,240 A | 7/1986 | Suman et al. | 297/408 |
| 4,634,182 A | 1/1987 | Tanaka | 297/379 |
| 4,687,252 A | 8/1987 | Bell et al. | 297/374 |
| 4,690,458 A | 9/1987 | Pipon et al. | 297/379 |
| 4,696,515 A | 9/1987 | Heesch | 297/374 |
| 4,702,494 A | 10/1987 | Escaravage | 280/808 |
| 4,705,319 A | 11/1987 | Bell | 297/362 |
| 4,720,144 A | 1/1988 | Heesch | 297/362 |
| 4,781,415 A | 11/1988 | Heesch et al. | 297/362 |
| 4,814,714 A | 3/1989 | Beadle | 328/127 |
| 4,969,515 A | 11/1990 | Dollison | 166/133 |
| 5,109,963 A * | 5/1992 | Husted et al. | 192/8 C |
| 5,163,736 A | 11/1992 | Aljundi | 297/379 |
| 5,833,317 A | 11/1998 | Massara et al. | 297/374 |
| 5,873,630 A * | 2/1999 | Yoshida et al. | 297/367 |
| 6,267,443 B1 * | 7/2001 | Kurita et al. | 297/374 |

* cited by examiner

MANUAL ADJUSTMENT MECHANISM FOR A VEHICLE

This application claims the benefit of Provisional Application No. 60/125,897, filed Mar. 24, 1999.

BACKGROUND OF THE INVENTION

1. Field of the Invention

The present invention relates to a manual adjustment mechanism for adjusting the position of various components in a vehicle.

2. Description of the Prior Art

Adjustment mechanisms are widely used in automotive vehicles for adjusting the position of a variety of components such as reclining seat backs, articulating seat cushions, head restraints, seat tracks, window panes, and the like. Many of such adjustment mechanisms commonly comprise a ratchet, or drive gear, operatively connected to a pawl, or sector gear, for selectively adjusting the position of the component connected to the pawl. These adjustment mechanism, however, have a limited range of adjustability and positioning as dictated by the range of movement between the drive gear and sector gear.

Other adjustment mechanisms include a cylindrical drum coupled to the component for positioning the component in response to infinitely adjustable rotation of the drum. A spring is generally coiled around the drum for applying a circumferential friction force on the outer cylindrical surface of the drum to prevent the rotation thereof when the adjustment mechanism is in a non-actuated position. A control device is commonly connected to the coiled spring for releasing the coiled spring from the drum to allow rotation of the drum, and therefore, positioning of the component. An example of a drum and coiled spring adjustment mechanism is illustrated in U.S. Pat. No. 5,163,736. The '736 patent discloses an adjustment mechanism for controlling the inclined position of a seat back relative to a seat cushion for an automotive seat assembly. A cylindrical drum is rotatably coupled between the seat cushion and the seat back for providing rotational movement of the seat back. A spring is coiled about the cylindrical drum and includes a first free end coupled to the seat cushion and a second free end coupled to a control arm. The control arm engages the second free end to coil, or compress, the spring around the drum create a frictional force therebetween to prevent the rotational movement of the seat back. The control arm also unwinds, or releases the compression of the spring coiled about the drum to allow rotation of the drum and seat back between a plurality of inclined positions. However, the adjustment mechanism fails to include a locking device coupled between the drum and the spring to compress the spring around the drum in response to incidental rotation of the seat back relative to the seat cushion. That is, incidental load forces on the seat back may result in "back driving" of the drum by overcoming the frictional forces between the spring and the drum.

Therefore, it is desirable to provide a manual adjustment mechanism for adjusting the relative position of the component while preventing incidental back driving of the component against the adjustment mechanism.

SUMMARY OF THE INVENTION

Accordingly, the present invention relates to a manual adjustment mechanism for adjusting a relative position of a component with a vehicle. The mechanism comprises a support bracket, an input shaft rotatably supported by the support bracket for providing rotary input to adjust the component, and an output shaft operatively coupled to the input shaft and rotatably supported by the support bracket for providing rotary output to adjust the component and for receiving rotary input from the component. The mechanism further includes a housing fixedly secured to the support bracket and having a tubular inner surface. A coupler is disposed within the housing and operatively coupled between the input shaft and the output shaft for transferring the rotary input of the input shaft to the rotary output of the output shaft. The coupler has a pair of spaced apart tube walls. The mechanism also includes a coiled spring seated between the housing and the coupler and compressed against the inner surface of the housing. The coiled spring has at least one tangential distal end disposed between the tube walls. A control device is mounted to the input shaft for rotating the coupler into engagement with the distal end of the coiled spring to release the spring from the inner surface and transfer the rotary input from the input shaft to the rotary output in the output shaft. The mechanism additionally includes a cam driver rotatably disposed within the coupler for engaging the distal end of the coiled spring in response to the rotary input of the output shaft to compress the coiled spring against the inner surface of the housing and prevent further rotation of the output shaft and the input shaft.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Referring to Figures, wherein like numerals indicate like or corresponding parts throughout the several views, a manual adjustment mechanism is generally shown at 10. The manual adjustment mechanism 10 is used for actuating, controlling and/or moving one or more components within an automotive vehicle. For example, the manual adjustment mechanism 10 may be used for adjusting the fore and aft position of a vehicle seat assembly, reclining movement of a seat back relative to a seat cushion for an vehicle seat assembly, lumbar or side bolster adjustment of a seat assembly, seat cushion articulation, head restraint adjustment and articulation, or the like. The manual adjustment mechanism 10 may also be used for manually actuating a window pane that is slidably mounted within a side panel or door panel of a vehicle. The adjustment of such components will be further described and illustrated hereinbelow.

Figure 1:
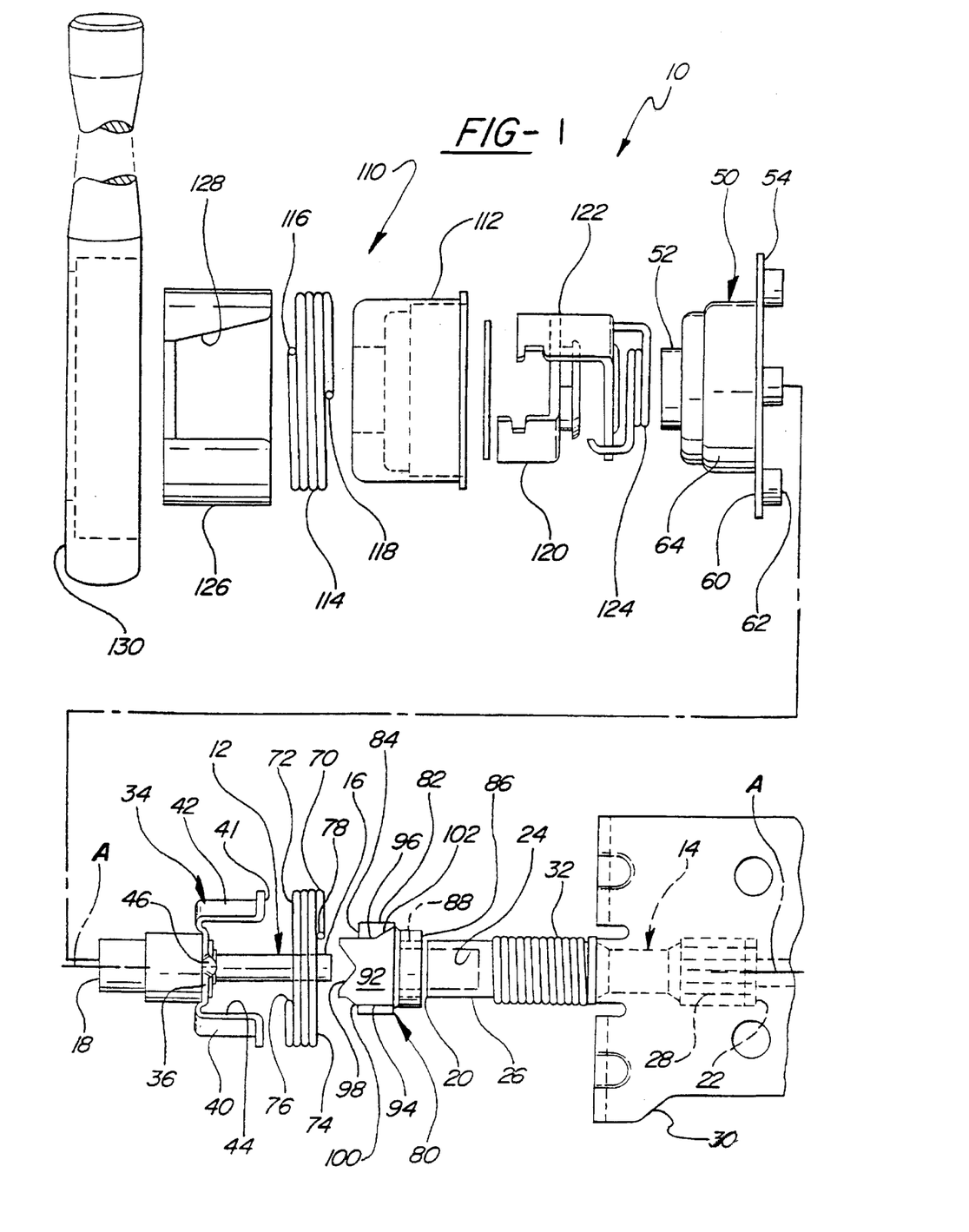
FIG. 1 is an exploded top view of a manual adjustment mechanism in accordance with the subject invention.
Figure 2:
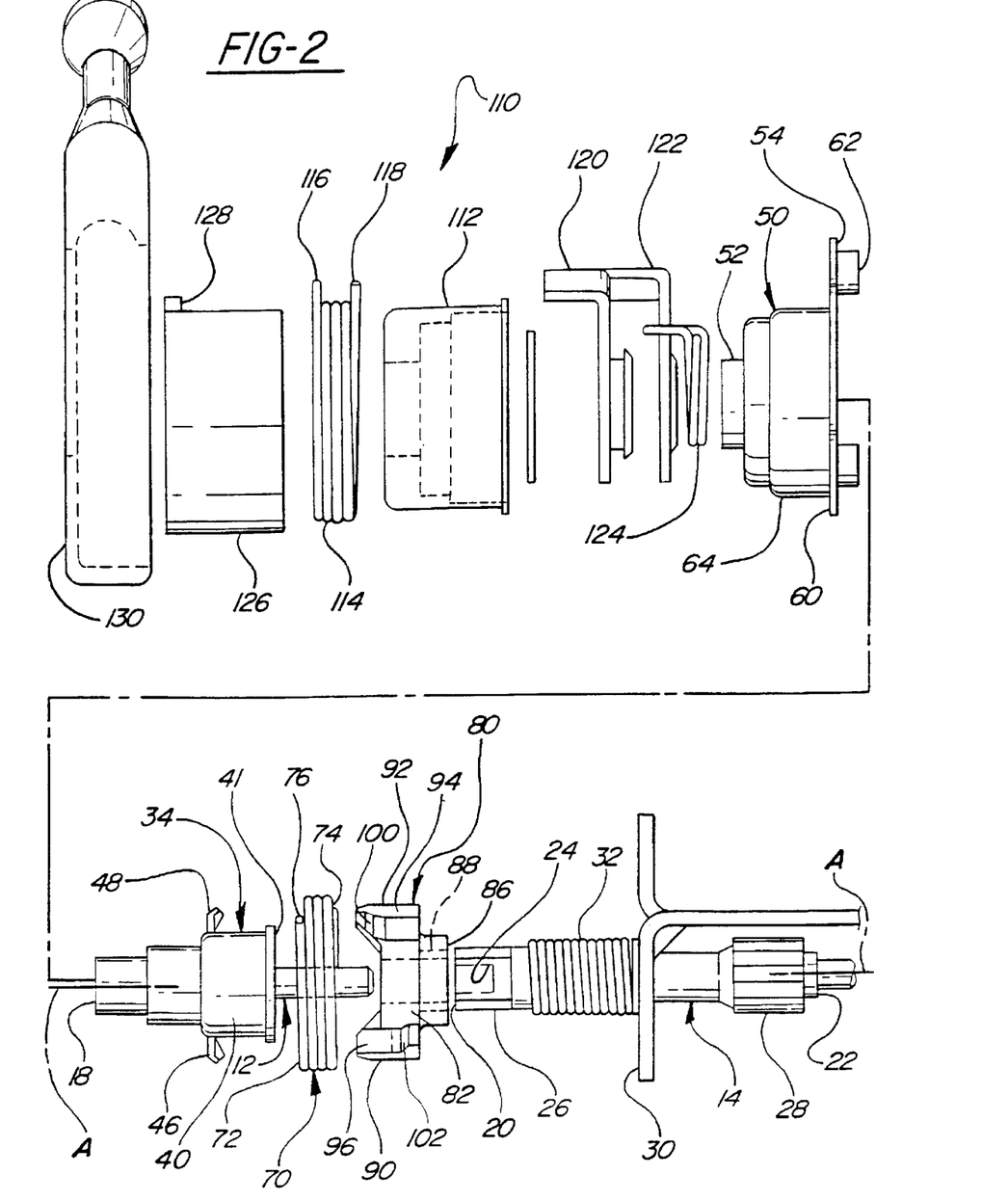
FIG. 2 is an exploded side view of the manual adjustment mechanism.

Referring to FIGS. 1 and 2, the manual adjustment mechanism 10 is shown in exploded views. The manual adjustment mechanism 10 includes an input shaft 12 and an output shaft 14 extending along a longitudinal axis A. The input shaft 12 includes an elongated cylindrical shaft extending between a first end 16 and an opposite second end 18. The output shaft 14 similarly includes an elongated cylindrical shaft extending between a first end 20 and an opposite second end 22. The first end 20 of the output shaft 14 includes an inner center bore 24 for receiving the first end 16 of the input shaft 12. The first end 20 of the output shaft 14 further includes a plurality of exterior channels 26 extending longitudinally from the first end 20 toward the second end 22. The second end 22 of the output shaft 14 includes a plurality of exterior gear teeth 28. The output shaft 14 is rotatably journaled to a support bracket 30 between the first end 20 and the second end 22. A coil spring 32 is disposed about the output shaft 14 between the first end 20 and the support bracket 30 and is compressible therebetween as will be further described.

Figure 5:
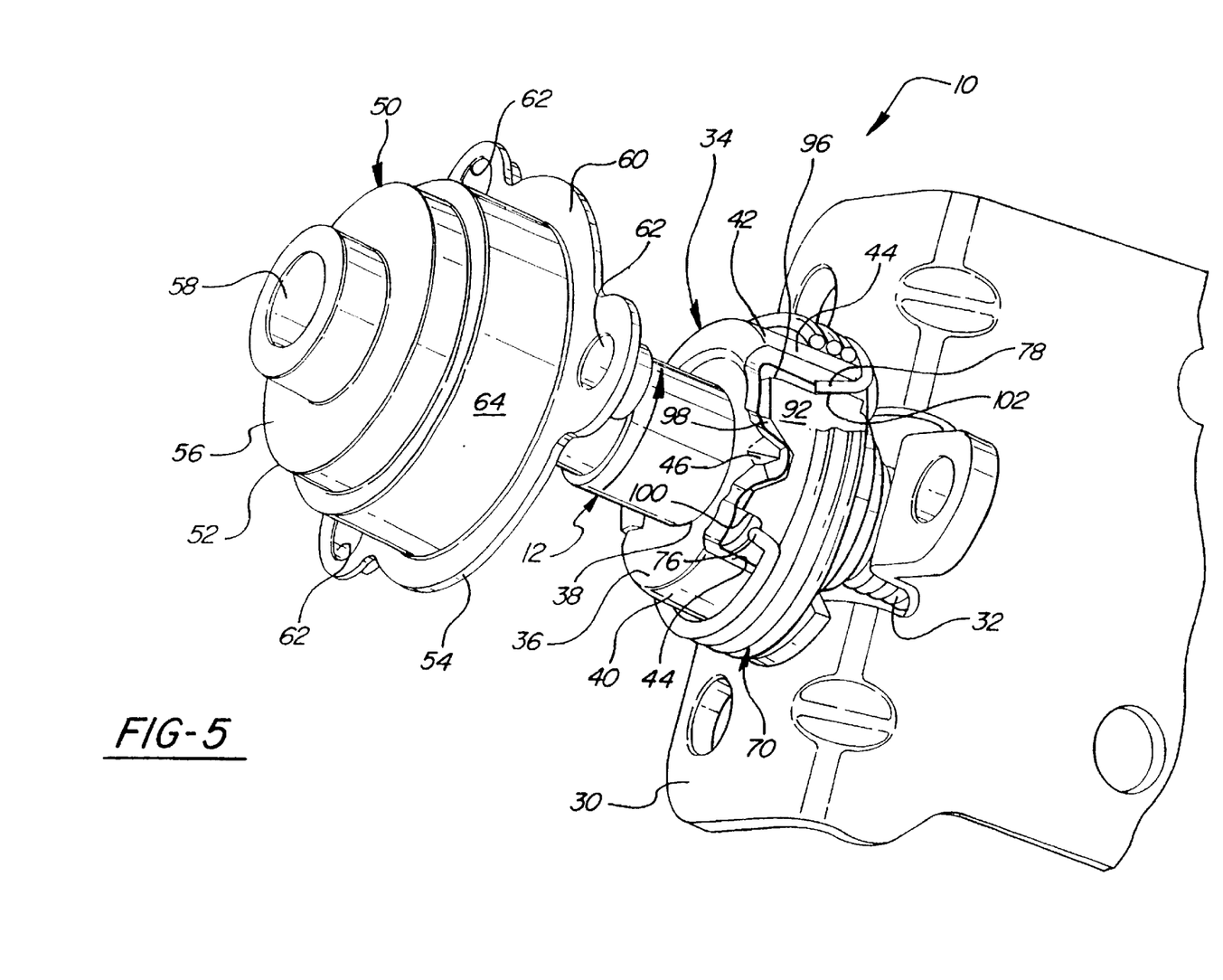
FIG. 5 is partially exploded perspective view of the manual adjustment mechanism in an actuated position.

The manual adjustment mechanism 10 further includes generally tubular shaped coupler 34 coupled to the input shaft 12 between the first end 16 and the second end 18. More specifically, as best shown in FIG. 5, the coupler 34 includes a circular base plate 36 having a center through-hole 38 for receiving the input shaft 12 therethrough. The base plate 36 may be fixedly or removably secured to the input shaft 12 between the first end 16 and second end 18 by a key-way, weld or any suitable coupling means. The coupler 34 further includes a pair of spaced apart and opposing tube walls 40, 42 extending axially from the base plate 36 toward the first end 16 of the input shaft 12 to distal ends 41. The tube walls 40, 42 define U-shaped slots 44 therebetween spaced about opposing circumferential sides of the base plate 36. The coupler 34 further includes a pair of V-shaped tabs 46, 48 projecting outwardly, or tangential, from opposite circumferential sides of the base plate 36. More specifically, one of the tabs 46, 48 projects outwardly from the circumferential edge of the base plate 36 midway between each of the opposing tube walls 40, 42 and is centered in the slots 44.

The manual adjustment mechanism 10 also includes a bell-shaped housing, or cap, 50 extending between a first end 52 and a second end 54. The first end 52 is defined by a circular end cap 56 having a circular bore 58 therethrough as best shown in FIG. 5. The second end 54 is defined by a cylindrical flange 60 having a plurality of collets 62 therein. The housing 50 is fixedly secured to the support bracket 30 by connecting fasteners, pop rivets, or the like through the collets 62 and the support bracket 30. The housing 50 further includes a cylindrical tube wall 64 extending between the end cap 56 and the flange 60. Referring to FIG. 4, the tube wall 64 has an inner tube wall surface 66. The coupler 34 is received in the opened second end 54 of the housing 50 and encapsulated by the tube wall 64. The second end 18 of the input shaft 12 is rotatably received within the circular bore 58 and extends axially from the first end 52, as best shown in FIG. 3.

Figure 6:
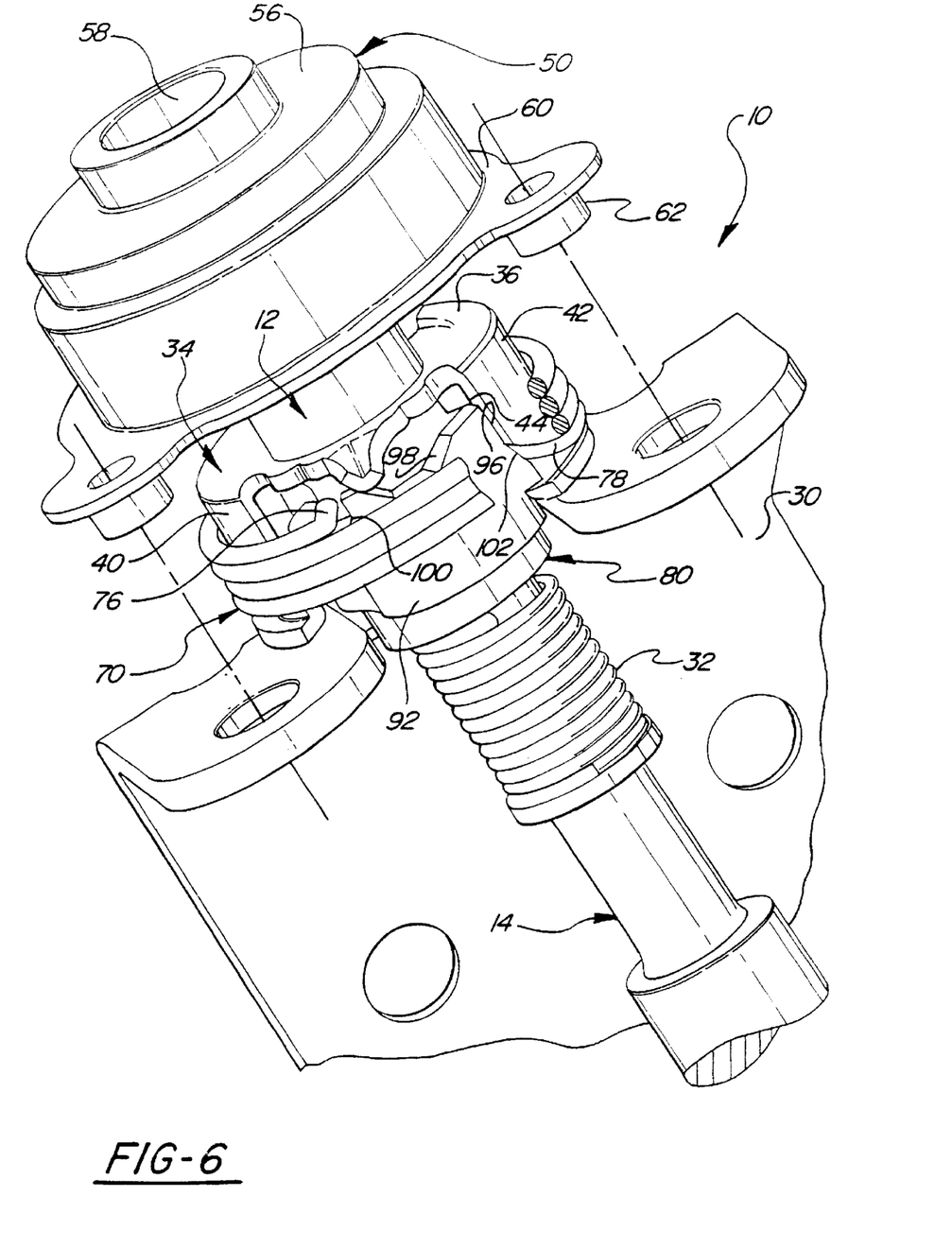
FIG. 6 is a partially exploded perspective view of the manual adjustment mechanism in a locked position.
Figure 7:
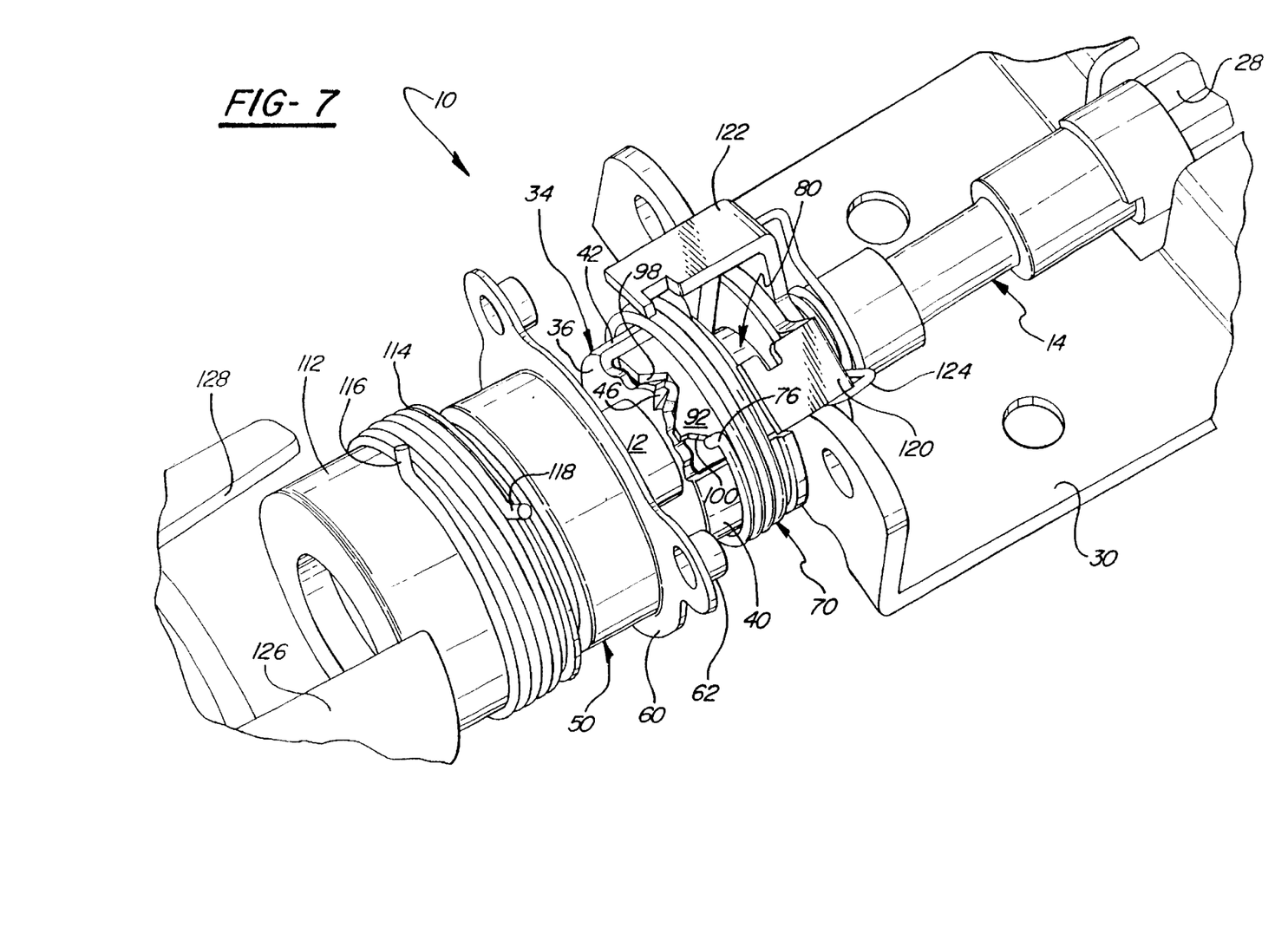
FIG. 7 is a partially exploded perspective view of the manual adjustment mechanism in a non-actuated position.

Still referring to FIGS. 1 and 2, the manual adjustment mechanism 10 additionally includes an inner coil spring 70 positioned between the coupler 34 and the inner tube wall surface 66 of the housing 50. The inner coil spring 70 has a first end 72 seated adjacent the first end 52 of the housing 50 and an opposite second end 74 seated adjacent the second end 54 of the housing 50. The inner coil spring 70 further includes spaced apart first and second distal ends 76, 78 extending tangentially inwardly from the coil spring 70 toward the coupler 34. More specifically, the inner coil spring 70 is preloaded and compressed against the inner tube wall surface 66 and slightly spaced from the tube walls 40, 42 of the coupler 34. The distal ends 76, 78 extend inwardly from the coil spring 70 and project into one of the slots 44 between the spaced apart tube walls 40, 42 as shown in FIGS. 5–7. Referring specifically to FIG. 5, the distal end 76 projects into the slot 44 adjacent the tube wall 40 and the base plate 36. The distal end 78 projects into the slot 44 adjacent the opposite tube wall 42 and the distal end 41. Therefore, the distal ends 76, 78 of the inner coil spring 70 are spaced apart laterally as well as axially between the tube walls 40, 42.

Still further, the manual adjustment mechanism 10 includes a cam driver 80 coupled to the first end 20 of the output shaft 14. The cam driver 80 includes a hollow, cylindrical base 82 extending axially from a first end 84 to a second end 86. The inner surface of the an hollow base 82 includes a plurality of elongated notches 88 extending to the second end 86 for sliding meshed engagement with the exterior channels 26 on the output shaft 14. That is, the cam driver 80 is able to slide axially along the longitudinal length of the first end 20 of the output shaft 14 yet is coupled and locked from rotational movement about the shaft 14. A pair of opposing wedge drivers 90, 92 extend axially from the outer surface of the base 82 and project from the first end 84. The wedge drivers 90, 92 are positioned on circumferentially opposite sides of the base 82. Each wedge driver 90, 92 includes parallel side edges 94, 96 interconnected by a V-shaped notch 98. Referring to FIG. 2, each wedge driver 90, 92 also includes an upper ramped surface 100 between the side edge 94 and the tip of the notch 98 and a lower ramped surface 102 between the side edge 96 and the base 82. The cam driver 80 is seated between the tube walls 40, 42 of the coupler 34 and also encased by the housing 50. As shown in FIG. 5, the cam driver 80 is positioned such that the tabs 46, 48 are seated within the V-shaped notches 98 of the respective opposing wedge drivers 90, 92 for engagement therewith as will be further described.

Figure 3:
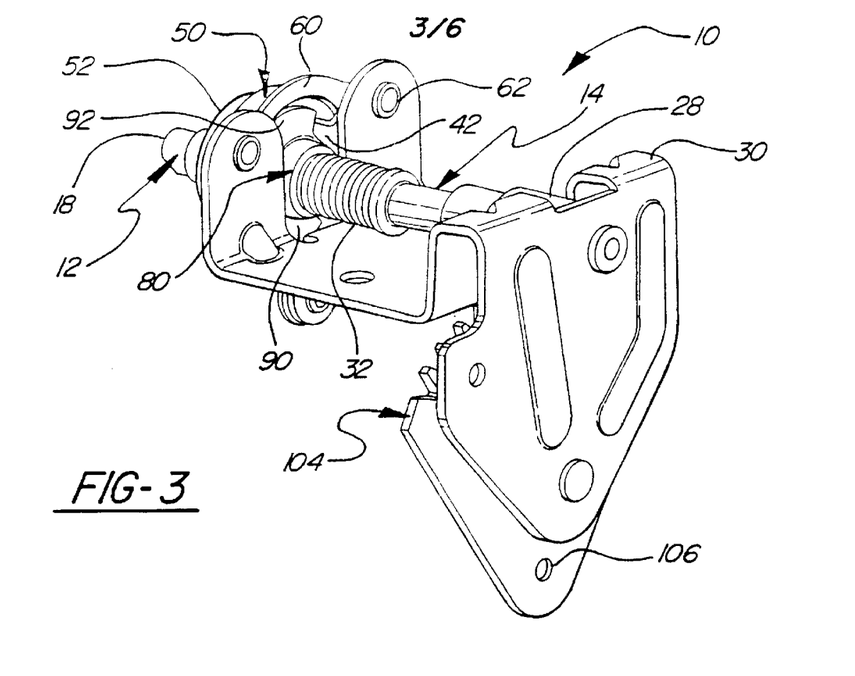
FIG. 3 is a rear perspective view of the manual adjustment mechanism mounted to a support bracket and engaged with a gear rack.
Figure 4:
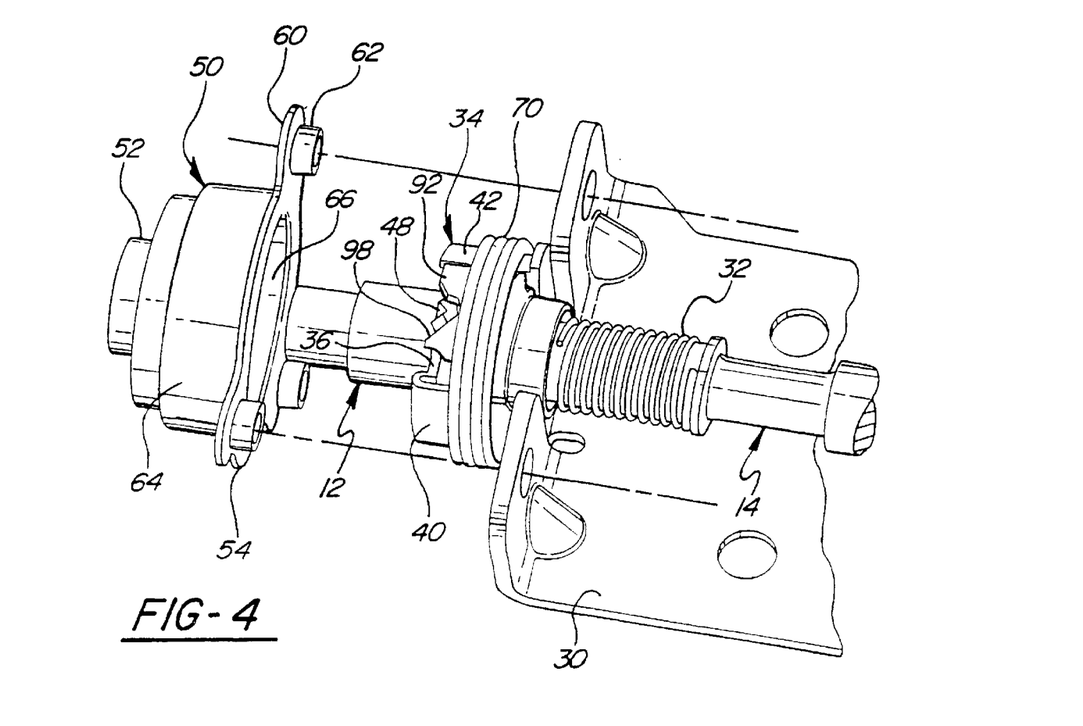
FIG. 4 is a partially exploded perspective view of the manual adjustment mechanism.

Referring to FIG. 3, the manual adjustment mechanism 10 is assembled between the housing 50 and the support bracket 30. The gear teeth 28 on the second end 22 of the output shaft 14 are arranged for mating engagement with a gear rack 104 adjacent the support bracket 30. Therefore, rotation of the output shaft 14 will translate the gear rack 104 either rotationally about a pivot 106, as shown, or linearly. It should be appreciated that the second end 22 of the output shaft 14 may be coupled to any device or component for rotational a movement by the output shaft 14.

Referring again to FIGS. 1 and 2, the manual adjustment mechanism 10 also includes a control device 110 for actuating and rotating the input shaft 12 in both the clockwise and counterclockwise direction. The control device 110 includes a hollow, cylindrical drum 112 for encasing the housing 50. The drum 112 is fixedly secured to the second end 18 of the input shaft 12. An outer coil 114 is tensioned around the outer cylindrical surface of the drum 112. The outer coil spring 114 includes opposing distal ends 116, 118 extending tangentially from the coil spring 114. First and second return plates 120, 122 are rotationally coupled to the end of the housing 50 for engaging the respective distal ends 116, 118 of the coil spring 114. A return spring 124 is also coupled to the end of the housing 50 and operatively coupled to each of the return plates 120, 122 for biasing the plates 120, 122 towards each other. The drum 112 and coil spring 114 are covered by a tubular trim cover 126 which includes a window 128 for receiving and allowing movement of the return plates 120, 122 therebetween. Finally, an actuation handle 130 is coupled to the second end 18 of the input shaft 12 and operatively coupled between the distal ends 116, 118 of the coil spring 114 for rotating the drum 112 in both the clockwise and counter-clockwise direction. The rotation of the drum 112 forces rotation of the input shaft 12 and actuation of the manual adjustment mechanism 10 as will be further described below. Further description and operation of the control device 110 is fully set forth in applicant's co-pending U.S. patent application Ser. No. 09/807,306, filed Apr. 11, 2001, the disclosure of which is incorporated herein by reference in its entirety.

Referring now to FIGS. 4–7, the operation of the manual adjustment mechanism 10 will be further described. First, the manual adjustment mechanism 10 is shown in a non-actuated position in FIGS. 4 and 5. The housing 50 is shown exploded, and thus, displaced from covering the inner coil spring 70, coupler 34 and cam driver 80. In the non-actuated position, the inner coil spring 70 is compressed against the inner surface 66 of the housing 50. The coupler 34 is seated within the housing 50 such that the distal ends 76, 78 of the coil spring 70 are positioned within one of the slots 44 between the tube walls 40, 42 of the coupler 34 and on opposing sides of the associated tab 46, 48. The cam driver 80 is seated within the coupler 34 such that the wedge drivers 90, 92 are positioned within the respective slots 44 between the tube walls 40, 42 of the coupler 34. Additionally, the tabs 46, 48 are seated within the V-shaped notches 98 of the respective wedge drivers 90, 92. As shown best in FIG. 5, the distal end 76 of the coil spring 70 is positioned between the tube wall 40 and the side edge 94 of the wedge driver 90, 92 and the distal end 78 is positioned between the tube wall 42 and the side edge 96 of the wedge driver 90, 92. A gap is created between the tube walls 40, 42 and the adjacent side edges 94, 96 of the associated wedge driver 90, 92 to allow movement of the distal ends 76, 78 therein. In the non-actuated position, the input shaft 12, and therefore the output shaft 14, is prevented from rotating in either the clockwise direction or the counter-clockwise direction. That is, the distal ends 76, 78 of the coil spring 70 abut the tube walls 40, 42 and the wedge drivers 90, 92. Since the coil spring 70 is compressed and frictionally retained against the inner surface 66 of the housing 50, the distal ends 76, 78 prevent the coupler 34 and cam driver 80 from being free to rotate within the housing 50. Therefore, the compression, or friction, between the coil spring 70 and the housing 50 must be reduced in order for the input shaft 12 to rotate the coupler 34 and cam driver 80 to rotate the output shaft 14.

Referring to FIG. 5 again, to actuate the manual adjustment mechanism 10, the handle 130 is rotated in either the clockwise or counter-clockwise direction. The control device 110 urges the input shaft 12 to rotate in the equivalent clockwise or counter-clockwise direction. For illustrated purposes only, the actuation will be described with the handle 130 and thus the input shaft 12 rotated in the counter-clockwise direction as shown. The input shaft 12 is coupled to the coupler 34 to force the coupler 34 to also rotate in the same direction. When the coupler 34 rotates, the tab 46 cams up the inclined surface of the V-shaped notch 88 in the wedge driver 92 against the compression force of the coil spring 32. The distal end 76 of the coil spring 70 also cams along the upper ramped surface 100 on the wedge driver 92 while the distal end 78 cams along the lower ramped surface 102 on the wedge driver 92. The coupler 34 will therefore continue to rotate until the tube wall 40 engages the distal end 76 of the coil spring 70 and captures the distal end 76 between the tube wall 40 and the ramped surface 100. The other distal end 78 engages the side edge 96 of the wedge driver 92 to retain the distal end 78 thereagainst. As the coupler 34 continues to rotate, the distal end 76 of the coil spring 70 is pulled to wind the coil spring 70, or tension the coil spring 70. The winding of the coil spring 70 reduces its outside diameter to therefore reduce it compression or friction against the inner surface 66 of the housing 50. The coil spring 70 is now free to rotate with the coupler 34 within the housing 50. The wedge driver 92 of the cam driver 80 is captured between the distal ends 76, 78 of the coil spring 70 and thus also forced to rotate with the coupler 34. Since the cam driver 80 is rotationally coupled to the output shaft 14, the output shaft 14 rotates with the housing 50 and input shaft 12 to drive the gear rack 104 or other component. When the handle 130 is returned to its initial position by the control device 110, the manual adjustment mechanism 10 returns to its non-actuated position to prevent further rotation of the input and output shafts 12, 14. The manual adjustment mechanism 10 operates in the same, but opposite direction, when the handle 130 is rotated in the clockwise direction.

Finally, the manual adjustment mechanism 10 is also operable from the non-actuated position to a locked position to prevent incident rotation, or back-driving, of the output shaft 14 by movement of the gear rack 104 or other component in either direction. Referring to FIG. 6, when a rotation force in the clockwise direction, for example, is exerted on the output shaft 14, the output shaft 14 urges the cam driver 80 to rotate slightly. The tab 46 will cam along the inclined surface of the V-shaped notch 98 against the biasing force of the compression spring 32 to the position shown in FIG. 6. The distal end 78 of the coil spring 70 simultaneously cams along the lower ramped surface 102 until engaged with the side edge 96 of the wedge driver 92. The wedge driver 92 and cam driver 80 will push on the distal end 78 to unwind, or expand, the coil spring 70 against the inner surface 66 of the housing 50. The increased frictional resistance between the coil spring 70 and the housing 50 prevents further rotation of the cam driver 80, and therefore, the coupler 34 within the housing 50. With the cam driver 80 and coupler 34 locked by the spring 70, the input shaft 12 and output shaft 14 are prevented from rotating by the back-driving of the output shaft 14. The manual adjustment mechanism 10 operates in the same, but opposite direction, upon counter-clockwise rotation of the output shaft 14.

The invention has been described in an illustrative manner, and it is to be understood that the terminology, which has been used, is intended to be in the nature of words of description rather than of limitation.

Obviously, many modification and variations of the present invention are possible in light of the above teachings. It is, therefore, to be understood that within the scope of the appended claims, the invention may be practiced other than as specifically described.

What is claimed is:

1. A manual adjustment mechanism for adjusting a relative position of a component with a vehicle, said mechanism comprising:

a support bracket;

an input shaft rotatably supported by said support bracket for providing rotary input to adjust the component;

an output shaft operatively coupled to said input shaft and rotatably supported by said support bracket for providing rotary output to adjust the component and for receiving rotary input from the component;

a housing fixedly secured to said support bracket, said housing having a tubular inner surface;

a coupler disposed within said housing and operatively coupled between said input shaft and said output shaft for transferring said rotary input of said input shaft to said rotary output of said output shaft, said coupler having a pair of spaced apart tube walls;

a coiled spring seated between said housing and said coupler and compressed against said inner surface of said housing, said coiled spring having at least one tangential distal end disposed between said tube walls;

a control device mounted to said input shaft for rotating said coupler into engagement with said distal end of said coiled spring to release said spring from said inner surface and transfer said rotary input from said input shaft to said rotary output in said output shaft; and a cam driver rotatably disposed within said coupler for engaging said distal end of said coiled spring in response to said rotary input of said output shaft to compress said coiled spring against said inner surface of said housing and prevent rotation of said output shaft and said input shaft;

said cam driver including a wedge driver seated between said spaced apart tube walls for rotary movement therebetween, said wedge driver includes opposing side edges and said coiled spring includes a pair of distal ends extending between said tube walls adjacent said opposing side edges of said wedge driver for engagement therewith upon rotation of said output shaft in a clockwise and counter-clockwise direction, and wherein said wedge driver includes a V-shaped notch interconnecting said opposing side edges.

2. A manual adjustment mechanism a set forth in claim 1 wherein said coupler includes a tab projecting between said spaced apart tube walls and seated within said V-shaped notch.

3. A manual adjustment mechanism as set forth in claim 2 further including a spring bias member compressed between said support bracket and said cam driver for retaining said tab within said V-shaped notch.

4. A manual adjustment mechanism as set forth in claim 3 wherein said cam driver includes a cylindrical base coupled to said output shaft and said wedge driver extends from said base.

5. A manual adjustment mechanism as set forth in claim 4 wherein said wedge driver includes an upper ramped surface extending between one of said side edges and said V-shaped notch and a lower ramped surface extending between the other of said side edges and said base.

6. A manual adjustment mechanism as set forth in claim 5 wherein said output shaft has a plurality of channels and said base of said cam driver includes a plurality of notches meshed with said channels for providing sliding movement of said cam driver along the axis of said output shaft.

\* \* \* \* \*